US008574324B2

(12) United States Patent
Comrie et al.

(10) Patent No.: US 8,574,324 B2
(45) Date of Patent: Nov. 5, 2013

(54) REDUCING SULFUR GAS EMISSIONS RESULTING FROM THE BURNING OF CARBONACEOUS FUELS

(75) Inventors: Douglas C. Comrie, Stow, OH (US); Vincent A. Vellella, Coraopolis, PA (US)

(73) Assignee: NOx II, Ltd., Port Clinton, OH (US)

( * ) Notice: Subject to any disclaimer, the term of this patent is extended or adjusted under 35 U.S.C. 154(b) by 1098 days.

(21) Appl. No.: 11/631,046

(22) PCT Filed: Apr. 8, 2005

(86) PCT No.: PCT/US2005/011881
§ 371 (c)(1),
(2), (4) Date: Dec. 28, 2006

(87) PCT Pub. No.: WO2006/006978
PCT Pub. Date: Jan. 19, 2006

(65) Prior Publication Data
US 2008/0286703 A1 Nov. 20, 2008

Related U.S. Application Data

(60) Provisional application No. 60/583,420, filed on Jun. 28, 2004.

(51) Int. Cl.
C10L 5/00 (2006.01)
C10L 10/00 (2006.01)
B01D 53/50 (2006.01)
B01D 53/64 (2006.01)
F23B 90/00 (2011.01)

(52) U.S. Cl.
USPC .............................. 44/641; 431/2; 423/244.07

(58) Field of Classification Search
USPC .......... 44/628, 641, 620–623; 431/2; 423/210, 423/242.1, 244.01, 244.07; 422/105, 108, 422/111
See application file for complete search history.

(56) References Cited

U.S. PATENT DOCUMENTS

| 174,348 A | 3/1876 | Brown |
| 202,092 A | 4/1878 | Breed |
| 208,011 A | 9/1878 | Eaton |
| 224,649 A | 2/1880 | Child |
| 229,159 A | 6/1880 | McCarty |
| 298,727 A | 5/1884 | Case |
| 346,765 A | 8/1886 | McIntyre |
| 347,078 A | 8/1886 | White |
| 367,014 A | 7/1887 | Wandrey et al. |
| 537,998 A | 4/1895 | Spring et al. |
| 541,025 A | 6/1895 | Gray |
| 625,754 A | 5/1899 | Garland |
| 647,622 A | 4/1900 | Vallet-Rogez |
| 685,719 A | 10/1901 | Harris |
| 688,782 A | 12/1901 | Hillery |
| 700,888 A | 5/1902 | Battistini |
| 744,908 A | 11/1903 | Dallas |
| 846,338 A | 3/1907 | McNamara |
| 894,110 A | 7/1908 | Bloss |
| 896,876 A | 8/1908 | Williams |
| 911,960 A | 2/1909 | Ellis |
| 945,331 A | 1/1910 | Koppers |
| 945,846 A | 1/1910 | Hughes |
| 1,112,547 A | 10/1914 | Morin |
| 1,167,471 A | 1/1916 | Barba |
| 1,167,472 A | 1/1916 | Barba |
| 1,183,445 A | 5/1916 | Foxwell |
| 1,788,466 A | 1/1931 | Lourens |
| 1,984,164 A | 12/1934 | Stock |
| 2,016,821 A | 10/1935 | Nelms |
| 2,059,388 A | 11/1936 | Nelms |
| 2,089,599 A | 8/1937 | Crecelius |
| 2,511,288 A | 6/1950 | Morrell et al. |
| 3,194,629 A | 7/1965 | Dreibelbis et al. |
| 3,288,576 A | 11/1966 | Pierron et al. |
| 3,437,476 A | 4/1969 | Dotson et al. |
| 3,599,610 A | 8/1971 | Spector |
| 3,662,523 A | 5/1972 | Revoir et al. |

(Continued)

FOREIGN PATENT DOCUMENTS

| CA | 2026056 | 3/1992 |
| CN | 1177628 | 4/1998 |

(Continued)

OTHER PUBLICATIONS

International Search Report for PCT/US2005/011881, mailed Jun. 30, 2005.
Written Opinion of the ISA for PCT/US2005/011881, mailed Jun. 30, 2005.
McCoy et al., Full-Scale Mercury Sorbent Injection Testing at DTE Energy's St. Clair Station, Paper #97, DTE Energy, Aug. 30-Sep. 2, 2004.
Sudhoff Presentation: "Anticipated Benefits of the TOXECON Retrofit for Mercury and Multi-Pollutant Control Technology", National Energy Technology Laboratory, pp. 19, Nov. 19, 2003.
TECHNews From the National Energy Technology Laboratory, "DOE Announces Further Field Testing of Advanced Mercury Control Technologies, Six Projects Selected in Round 2 to Address Future Power Plant Mercury Reduction Initiatives", pp. 3, Nov. 5, 2004.
Turner, Jackie; News Release: Texas Genco, EPRI, and URS Corporation Test Innovative Mercury Control Method at Limestone Station, "Technology Aims to Capture More Mercury from Power Plant Exhaust", www.epri.com/corporate/discover_epri/news/2005/011105_mercury.html, pp. 2, Jan. 11, 2005, printed Jan. 20, 2005.

(Continued)

Primary Examiner — Pamela H Weiss
(74) Attorney, Agent, or Firm — Harness, Dickey & Pierce, P.L.C.

(57) ABSTRACT

A process for burning coal or other carbonaceous fuels captures sulfur and other undesirable compounds are captured and retained in non-reactive ceramic-like form after the combustion phase. The process involves addition of multiple element alkali powders and/or sorbents preferably containing oxidizing anions such as nitrates and nitrites, preferably based on calcium. In various embodiments, the remediation materials when applied in a complex powder and/or liquid containing multiple elements, result in higher sulfur capture than the materials would otherwise achieve on an individual basis. In a preferred embodiment, the sorbents contain elements that minimize or lower the melting point of the ash. This leads to lowered cohesiveness and toughness of the ash so that less ash builds up on the boiler and better heat transfer is obtained.

60 Claims, No Drawings

(56) References Cited

U.S. PATENT DOCUMENTS

| | | |
|---|---|---|
| 3,725,530 A | 4/1973 | Kawase et al. |
| 3,764,496 A | 10/1973 | Hultman et al. |
| 3,823,676 A | 7/1974 | Cook et al. |
| 3,838,190 A | 9/1974 | Birke et al. |
| 3,849,267 A | 11/1974 | Hilgen et al. |
| 3,849,537 A | 11/1974 | Allgulin |
| 3,956,458 A | 5/1976 | Anderson |
| 3,961,020 A | 6/1976 | Seki |
| 3,974,254 A | 8/1976 | de la Cuadra Herra et al. |
| 4,040,802 A | 8/1977 | Deitz et al. |
| 4,075,282 A | 2/1978 | Storp et al. |
| 4,094,777 A | 6/1978 | Sugier et al. |
| 4,101,631 A | 7/1978 | Ambrosini et al. |
| 4,115,518 A * | 9/1978 | Delmon et al. .......... 423/244.08 |
| 4,148,613 A | 4/1979 | Myers |
| 4,174,373 A | 11/1979 | Yoshida et al. |
| 4,196,173 A | 4/1980 | deJong et al. |
| 4,226,601 A | 10/1980 | Smith |
| 4,233,274 A | 11/1980 | Allgulin |
| 4,272,250 A * | 6/1981 | Burk et al. ....................... 44/574 |
| 4,280,817 A | 7/1981 | Chauhan et al. |
| 4,305,726 A | 12/1981 | Brown, Jr. |
| 4,322,218 A | 3/1982 | Nozaki |
| 4,377,599 A * | 3/1983 | Willard, Sr. .................... 426/310 |
| 4,387,653 A | 6/1983 | Voss |
| 4,394,354 A | 7/1983 | Joyce |
| 4,440,100 A | 4/1984 | Michelfelder et al. |
| 4,472,278 A | 9/1984 | Suzuki |
| 4,474,896 A | 10/1984 | Chao |
| 4,503,785 A | 3/1985 | Scocca |
| 4,519,807 A | 5/1985 | Nishino et al. |
| 4,519,995 A | 5/1985 | Schrofelbauer et al. |
| 4,555,392 A | 11/1985 | Steinberg |
| 4,582,936 A | 4/1986 | Ashina et al. |
| 4,602,918 A | 7/1986 | Steinberg et al. |
| 4,629,721 A | 12/1986 | Ueno |
| 4,693,731 A | 9/1987 | Tarakad et al. |
| 4,716,137 A | 12/1987 | Lewis |
| 4,741,278 A | 5/1988 | Franke et al. |
| 4,758,418 A | 7/1988 | Yoo et al. |
| 4,764,219 A | 8/1988 | Yan |
| 4,786,483 A | 11/1988 | Audeh |
| 4,804,521 A * | 2/1989 | Rochelle et al. ......... 423/244.04 |
| 4,807,542 A | 2/1989 | Dykema |
| 4,824,441 A * | 4/1989 | Kindig ............................. 44/604 |
| 4,830,829 A | 5/1989 | Craig, Jr. |
| 4,873,930 A | 10/1989 | Egnese et al. |
| 4,886,519 A | 12/1989 | Hayes et al. |
| 4,892,567 A | 1/1990 | Yan |
| 4,915,818 A | 4/1990 | Yan |
| 4,933,158 A | 6/1990 | Aritsuka et al. |
| 4,936,047 A | 6/1990 | Feldmann et al. |
| 4,964,889 A | 10/1990 | Chao |
| 5,013,358 A | 5/1991 | Ball et al. |
| 5,024,171 A | 6/1991 | Krigmont et al. |
| 5,049,163 A | 9/1991 | Huang et al. |
| 5,116,793 A | 5/1992 | Chao et al. |
| 5,126,300 A | 6/1992 | Pinnavaia et al. |
| 5,137,854 A | 8/1992 | Segawa et al. |
| 5,162,598 A | 11/1992 | Hutchings et al. |
| 5,190,566 A | 3/1993 | Sparks et al. |
| 5,238,488 A | 8/1993 | Wilhelm |
| 5,350,728 A | 9/1994 | Cameron et al. |
| 5,368,617 A | 11/1994 | Kindig |
| 5,379,902 A | 1/1995 | Wen et al. |
| 5,409,522 A | 4/1995 | Durham et al. |
| 5,435,980 A | 7/1995 | Felsvang et al. |
| 5,447,703 A | 9/1995 | Baer et al. |
| 5,460,643 A | 10/1995 | Hasenpusch et al. |
| 5,499,587 A | 3/1996 | Rodriquez et al. |
| 5,505,746 A | 4/1996 | Chriswell et al. |
| 5,505,766 A | 4/1996 | Chang |
| 5,571,490 A | 11/1996 | Bronicki et al. |
| 5,587,003 A | 12/1996 | Bülow et al. |
| 5,618,508 A | 4/1997 | Suchenwirth et al. |
| 5,635,150 A | 6/1997 | Coughlin |
| 5,659,100 A | 8/1997 | Lin |
| 5,670,122 A | 9/1997 | Zamansky et al. |
| 5,733,516 A | 3/1998 | DeBerry |
| 5,738,834 A | 4/1998 | DeBerry |
| 5,787,823 A | 8/1998 | Knowles |
| 5,810,910 A | 9/1998 | Ludwig et al. |
| 5,897,688 A | 4/1999 | Voogt et al. |
| 5,910,292 A | 6/1999 | Alvarez, Jr. et al. |
| 5,989,506 A | 11/1999 | Markovs |
| 6,024,931 A | 2/2000 | Hanulik |
| 6,083,289 A | 7/2000 | Ono et al. |
| 6,240,859 B1 | 6/2001 | Jones, Jr. |
| 6,258,334 B1 | 7/2001 | Gadkaree et al. |
| 6,372,187 B1 | 4/2002 | Madden et al. |
| 6,375,909 B1 | 4/2002 | Dangtran et al. |
| 6,475,451 B1 | 11/2002 | Leppin et al. |
| 6,521,021 B1 | 2/2003 | Pennline et al. |
| 6,528,030 B2 | 3/2003 | Madden et al. |
| 6,533,842 B1 | 3/2003 | Maes et al. |
| 6,558,454 B1 | 5/2003 | Chang et al. |
| 6,610,263 B2 | 8/2003 | Pahlman et al. |
| 6,613,110 B2 | 9/2003 | Sanyal |
| 6,719,828 B1 | 4/2004 | Lovell et al. |
| 6,732,055 B2 | 5/2004 | Bagepalli et al. |
| 6,737,031 B2 | 5/2004 | Beal et al. |
| 6,790,420 B2 | 9/2004 | Breen et al. |
| 6,808,692 B2 | 10/2004 | Oehr |
| 6,848,374 B2 | 2/2005 | Srinivasachar et al. |
| 6,878,358 B2 | 4/2005 | Vosteen et al. |
| 6,942,840 B1 | 9/2005 | Broderick |
| 6,953,494 B2 | 10/2005 | Nelson, Jr. |
| 6,962,617 B2 | 11/2005 | Simpson |
| 6,974,564 B2 | 12/2005 | Biermann et al. |
| 6,975,975 B2 | 12/2005 | Fasca |
| 2002/0114749 A1 | 8/2002 | Cole |
| 2002/0184817 A1 | 12/2002 | Johnson et al. |
| 2003/0103882 A1 | 6/2003 | Biermann et al. |
| 2004/0003716 A1 | 1/2004 | Nelson, Jr. |
| 2004/0013589 A1 | 1/2004 | Vosteen et al. |
| 2004/0219083 A1 | 11/2004 | Schofield |
| 2005/0039598 A1 | 2/2005 | Srinivasachar et al. |

FOREIGN PATENT DOCUMENTS

| | | |
|---|---|---|
| CN | 1354230 A | 6/2002 |
| CN | 1421515 | 6/2003 |
| CN | 1473914 | 2/2004 |
| DE | 25 48 845 A1 | 5/1976 |
| JP | 2000-325747 A | 11/2000 |
| WO | WO 0009256 A1 * | 2/2000 |

OTHER PUBLICATIONS

Vosteen et al., "Bromine Enhanced Mercury Abatement Recent Industrial Applications and Laboratory Research", Vosteen Consulting GmbH, Thermal Engineering and Flue Gas Cleaning, pp. 25, May 24 & 25, 2005.

www.entsorgung.bayer.com/index.cfm?PAGE_ID=209, Focus on your success, "Incineration: Taking the heat out of complex waste", pp. 2, Jun. 2, 2005.

www.entsorgung.bayer.com/index.cfmPAGE-ID=301, Focus on your success, "Incineration", pp. 2, Jun. 2, 2005.

XP-00260172, Abstract for CN 1177628.

XP-00260173, Abstract for CN 1473914.

* cited by examiner

REDUCING SULFUR GAS EMISSIONS RESULTING FROM THE BURNING OF CARBONACEOUS FUELS

The present invention relates to processes and compositions for decreasing emissions of sulfur gases upon combustion of carbonaceous materials. In particular, powder and liquid sorbent compositions are added to coal to capture sulfur in the ash and prevent release of sulfur oxides into the atmosphere.

Cost effective energy sources necessary for sustaining economic growth and national well-being are becoming more difficult to identify and develop. Increasing costs of fuels such as oil, gas and propane have led to an extensive examination of other available energy sources. Two of the most cost effective sources of energy are nuclear power and coal power. Given public concerns with nuclear energy and its long-term disposal challenges, more emphasis is being placed on coal-generated power.

Significant coal resources exist in the United States and elsewhere. According to some estimates, known reserves are capable of meeting large portions of our energy needs into the next two centuries. In the United States, low BTU value coal is found in the Powder River Basin of Wyoming/Montana, lignite deposits in the north central region (North and South Dakota), sub-bituminous deposits of the East Pittsburgh seam in Pennsylvania, Ohio and West Virginia, and bituminous coal is found in the Illinois Basin. Except for the Powder River Basin coals, the United States coals tend to be characterized as having a high sulfur content. Although low sulfur coal can be shipped to other locations to provide a relatively clean burning fuel, it is more cost effective for utilities to burn locally produced coal. In most parts of the world this means burning a higher sulfur coal to satisfy society's energy needs.

The burning of high sulfur coal releases a significant amount of sulfur-containing gases, which can cause acid rain and other harmful effects if allowed to escape from the coal burning facility. Utilities and other coal consumers are constantly striving to reduce or eliminate the amount of sulfur given off by power plants and coal powered boilers, in order to protect the environment and the health of its workers and customers. One effective strategy involves retrofitting older coal burning facilities with wet scrubbers for sulfur capture. These facilities are typically large in size and consume up to 5% of the energy generated by the plant. Although widely used, their cost is becoming almost prohibitively expensive, which leads to rate hikes that must be borne ultimately by the consumer or rate payer.

An alternative to wet scrubbing for removal of sulfur is the application of sulfur sorbing and stabilizing materials to the coal. Much work has been done in this area due to its ease of application and elimination of high capital costs for equipment as needed in wet scrubbing operations. Application of sulfur sorbent directly to the coal has the advantage of a long retention time with the furnace gases thus allowing for greater sulfur capture.

U.S. Pat. No. 4,824,441 by Kindig discusses several methods that have been tried in attempting to improve sulfur capture. Kelly, et al., concluded (first joint symposium on Dry $SO_2$ and simultaneous $SO_2/NO_x$ Control Technologies, EPA 600/9-85-020a, Paper no. 14, July 1985) that sulfur sorbents should be injected downstream to avoid high peak temperatures in the combustion zone. It was also suggested that the residence time of calcium-based sorbents should be maximized in the 1800-2250F.° zone of the furnace. Work conducted by Dykema (U.S. Pat. No. 4,807,542) suggests the use of silicon to help optimize sulfur capture when combined with CaO as a remediation agent. Steinberg in U.S. Pat. Nos. 4,602,918 and 4,555,392 has suggested the use of Portland cement as a sorbent for coal.

As these references indicate, there is a need for cost effective remediation of sulfur, nitrogen, mercury and chlorine resulting form the combustion of coal. More efficient and less costly removal techniques are still needed in order to effectively develop and utilize high sulfur coal resources.

SUMMARY

In various embodiments, the invention provides a process for burning coal or other carbonaceous fuels wherein sulfur and other undesirable compounds are captured and retained in non-reactive ceramic-like form after the combustion phase. In various embodiments, a variety of liquid and powder sorbents are added to the coal before combustion to remove sulfur and other undesirable elements from the volatile combustion products.

In various embodiments, the process of the present invention involves the capture of sulfur in a calcium and ceramic based matrix utilizing multiple element alkali powders and/or strongly oxidizing calcium and bromide based nitrates and nitrites. These remediation materials when applied in a complex powder containing multiple elements result in superior sulfur capture than these elements would otherwise achieve on an individual basis. In some embodiments, the materials contain bentonites and metakaolins, which will aid in raising the melting point of the ash thus minimizing oxidation and decreasing ash toughness, adhesion, and slagging.

Powder sorbent compositions contain inorganic materials that provide sources of silicon, aluminum, calcium, iron, and magnesium. In a preferred embodiment, the powder sorbent contains Portland cement, calcium oxide, optionally a clay, and a dolomitic material. It has been found that addition of the powder absorbent to coal before combustion mitigates or reduces the amount of sulfur gases produced during burning of the coal, or equivalently increases the amount of sulfur contained in the ash after combustion. Advantageously, the sorbent may be added to the coal at levels at up to six % by weight, avoiding large buildups of ash during combustion.

In various embodiments, powder sorbents are provided that reduce the amount of mercury and/or chlorine in the combustion gas as well as the amount of sulfur. Preferred powder sorbents for mitigation or reduction of mercury contain in addition to the metals indicated above a component comprising a water soluble chlorine containing inorganic compound. Additionally, the mercury sorbents preferably contain additional components selected from the group consisting of potassium and sodium silicates, hydroxides, and oxides. In a preferred embodiment, the mercury sorbent contains Portland cement, sodium chloride, calcium oxide, metakaolin, and at least one alkali metal salt selected from the group consisting of silicates, hydroxides, and oxides.

In preferred embodiments, the respective powder sorbents further comprise components that contribute oxidizing anions to the sorbent composition. Preferred oxidizing anions include nitrates and nitrites. The oxidizing anions may be added in the form of calcium nitrate and calcium nitrite, or as other oxidizing anion salts, depending on the level of calcium otherwise provided in sorbent composition and other factors.

The oxidizing anions may be added to the powder sorbent composition in the form of solid inorganic salts. In a preferred embodiment, the oxidizing anions such as nitrites and nitrates are applied to the coal in a separate step. In a preferred embodiment, an aqueous solution comprising about 20% to 80% of inorganic salts comprising the oxidizing anions is applied to the coal. Preferably, the solution is applied to the coal before a powder sorbent is applied.

In a preferred embodiment, a liquid sorbent comprising calcium or other salts of nitrates and nitrites is applied to the coal. Thereafter, the powder sorbent systems described above are applied to the wetted coal, to form a combustible coal composition. Alternatively, a liquid or solid sorbent composition containing calcium nitrate and calcium nitrite may be added to the coal and the coal further combusted, with an observed reduction in the amount of sulfur gases being released into the atmosphere, while at the same time the amount of sulfur in the ash is observed to increase.

The sorbents can be added directly to raw coal or to crushed and pulverized fuel. Liquid sorbents may be added through a spray bar system added directly to the fuel as it passes over a belt or other transport system. Alternatively, the liquid may be added into a mixer where the fuel is mixed with the liquid sorbent prior to combustion. The powder sorbents are preferably added to a crushed or pulverized fuel in a mixer system prior to combustion. As discussed, in a preferred embodiment, the powder sorbents are added to coal that has already been wetted with a liquid sorbent system. It is preferred to add the sorbents in such a way as to maximize contact time between the sorbent and the fuel during combustion. This in turn will result in sintering of the calcium and sulfur elements in the boiler to a preferred extent. Conveniently, liquid sulfur sorbents are generally added in the ratio of sorbent to sulfur of between one and two. Such addition levels are generally sufficient to adsorb sulfur and fuels having sulfur content ranging from about 2% to about 4.5%. Typical additions comprise adding about 6% by weight of sorbent, related to the weight of the raw fuel feed.

In various embodiments, the process of the invention involves the capture of sulfur in a calcium and ceramic based matrix utilizing multiple element alkali powders, optionally together with oxidizing anions such as nitrates and nitrites, preferably based on calcium. The remediation materials, when applied in a complex powder containing multiple elements, result in higher sulfur capture than the materials would otherwise achieve on an individual basis. In a preferred embodiment, the powder sorbents contain clays coupled with iron and other elements. It is believed that the presence of these elements acts to minimize or lower the melting point of the ash. This leads to lowered cohesiveness and toughness of the ash so that less ash builds up on the boiler and better heat transfer is obtained. This minimization of slagging, or buildup of the ash on the boiler during combustion, provides advantages to the use of the compositions and processes of the invention.

Further areas of applicability of the present invention will become apparent from the detailed description provided hereinafter. It should be understood that the detailed description and specific examples, while indicating some preferred embodiments of the invention, are intended for purposes of illustration only and are not intended to limit the scope of the invention.

DESCRIPTION

The following description of the preferred embodiment(s) is merely exemplary in nature and is in no way intended to limit the invention, its application, or uses.

In various embodiments, the invention provides liquid and powder sorbent compositions and methods for applying them to carbonaceous fuel. Coal is a preferred carbonaceous fuel to use in embodiments of the invention. When coal or other carbonaceous fuel containing sulfur is burned, sulfur gases are released into the atmosphere. Likewise, if the coal or other carbonaceous fuel contains chlorine or mercury, those elements may be released into the atmosphere. Because the sulfur, chlorine, and mercury thus released would otherwise pollute the atmosphere, it is desirable to prevent or reduce that release by use of liquid and powder sorbents of the invention.

By use of some of the embodiments of methods and compositions of the invention, upon combustion of the carbonaceous fuel to release its stored energy, the amount of sulfur gases in the combustion product is reduced, and the amount of sulfur in the ash is increased, relative to the amount of sulfur gases and ash sulfur, respectively, that would be produced by combustion of the carbonaceous fuel without applying the liquid and/or powder sorbent compositions of the invention.

The liquid and sorbent compositions of the invention contain a variety of inorganic components that are sources of active elements and compounds in the compositions. Some of the components are water soluble and are conveniently applied as part of a liquid sorbent composition. Other components of the sorbent compositions of the invention are water insoluble and are therefore preferably added as solids, or as part of so-called powder compositions, to the carbonaceous fuel by a variety of physical processes, including mixing. In various embodiments it is preferred to add both a liquid and a powder sorbent composition to the carbonaceous fuel, to achieve the advantages of the invention discussed further below.

In other embodiments, combustible carbonaceous fuel compositions are provided that are the product of the application or addition of the various powder and/or liquid sorbent compositions onto the carbonaceous fuel. In practicing the combustible carbonaceous fuel compositions of the invention, it is to be appreciated that the inorganic materials applied to the carbonaceous fuel to provide the compositions may be added in a variety of ways, including application of various liquid and powder sorbents of the invention.

In various preferred embodiments, compositions and methods of the invention may be used to remediate or mitigate the amount of mercury and other harmful elements released into the atmosphere upon combustion of carbonaceous fuels. As discussed in further detail below, compositions and methods that reduce the amount of mercury or chlorine emitted are made and practiced in essentially the same way as for those compositions that are more directly drawn to sulfur gas remediation.

In one embodiment, the invention provides a method of applying a sorbent composition onto a carbonaceous fuel and combusting the carbonaceous fuel to release the energy stored. The sorbent composition contains a source of calcium ion and a source of an oxidizing anion. An oxidizing anion is one that facilitates the oxidation of sulfur in the carbonaceous fuel to sulfate and other non-volatile components that wind up in the ash of the burned carbonaceous fuel. Non-limiting examples of oxidizing anions include nitrate and nitrite anions. In a preferred embodiment, the sorbent composition contains calcium nitrite and/or calcium nitrate. In various embodiments, the sorbent composition further comprises calcium bromide.

In one embodiment of the invention, the sorbent composition is applied onto the carbonaceous fuel by applying an aqueous solution containing the calcium and oxidizing anion onto the fuel. An effective amount of the sorbent composition is applied onto the carbonaceous fuel to reduce the amount of sulfur gases released into the atmosphere upon combustion. In various embodiments, up to 6% of the sorbent composition is added onto the fuel. In various other embodiments, up to 3% or up to 1.5% of the sorbent composition is applied to the fuel, the percentages being based on the dry weight of the fuel. Higher amounts of the sorbents can be applied as well.

In various other preferred embodiments, the sorbent composition further contains inorganic sources of a variety of elements shown to be helpful in reducing the amount of sulfur gases emitted during combustion. In a preferred embodiment, the sorbent composition further contains inorganic sources of silicon, aluminum, and iron. Preferably, the sorbent further comprises an inorganic source of magnesium. The sorbent may contain additional insoluble inorganic sources of calcium such as calcium oxide. In a non-limiting example, the method comprises adding a powder composition containing silicon, aluminum, calcium, iron, and magnesium onto the carbonaceous fuel. The elements may be provided in the form of components such as Portland cement, dolomite, and burnt dolomite. In a particularly preferred embodiment, the method comprises applying an aqueous solution containing calcium nitrate and calcium nitrite onto particulate carbonaceous fuel such as coal, and adding a powder composition containing silicon, aluminum, calcium, iron, and magnesium onto the wetted fuel.

In an alternative embodiment, the sorbent composition contains Portland cement, calcium oxide, a dolomitic material selected from the group consisting of dolomite and burnt dolomite, and preferably an aluminosilicate clay. Preferably, up to 6% by weight, up to 3% by weight, or up to 1.5% by weight of the sorbent composition is added onto the fuel, based on the dry weight of the sorbent composition and the fuel.

The clay may be selected from a wide variety of materials. Preferred clays include calcium montmorillonite, sodium montmorillonite, kaolin, and combinations thereof. In a non-limiting example, the sorbent composition comprises about 20% to about 50% by weight Portland cement, about 20% to about 40% by weight calcium oxide, about 15% to about 25% by weight of the dolomitic material, and about 5 to about 15 weight percent of the clay. An exemplary sorbent composition comprises about 30% by weight Portland cement, about 40% by weight calcium oxide, about 20% by weight dolomitic material, and about 10% clay.

The sorbent composition may further comprise an oxidizing salt selected from the group consisting of soluble metal nitrates, soluble metal nitrites, and combinations thereof. Preferred soluble metal nitrates and nitrites include those of the alkali metals and the alkaline earth metals. Calcium nitrate and calcium nitrite, as well as their combination, are particularly preferred oxidizing salts.

When the sorbent composition contains oxidizing salts, the oxidizing salts may be applied to the fuel in an aqueous solution containing the soluble metal nitrates and nitrites discussed above. Thus, in a preferred embodiment, a solution of nitrates and/or nitrites, such as calcium nitrate and calcium nitrite, may be applied in an aqueous solution to the fuel, followed by application of a solid or powder sorbent composition containing Portland cement, calcium oxide, a dolomitic material as discussed above, and preferably a clay as discussed above. Preferably, up to 6 weight percent of the sorbent composition is applied to the fuel. In various embodiments, up to 3 weight percent of a powder composition as described above and up to 3 weight percent of a liquid sorbent composition may be applied. In a particularly preferred embodiment, up to 3 weight percent of the powder composition may be applied to the fuel as well as up to 1.5 weight percent of the solids in the liquid sorbent, based on the weight of the carbonaceous fuel.

In an alternative embodiment of applying a powder sorbent composition onto carbonaceous fuel and combusting the fuel, the sorbent composition applied to the fuel contains Portland cement, at least one water soluble chlorine containing inorganic compound, calcium oxide, optionally and preferably a clay, and at least one alkali metal salt selected from the group consisting of sodium silicate, potassium silicate, sodium hydroxide, potassium hydroxide, sodium oxide, and potassium oxide. In some embodiments, it has been found that adding such powder sorbent composition reduces the amount of mercury in the combustion products as well as the amount of sulfur.

The water soluble chlorine containing inorganic compound is believed to provide chlorine in a form that interacts with mercury from the coal to form non-volatile combustion products. The water solubility of the chlorine containing compound is believed to aid in its adsorption on the coal prior to combustion, and an intimate mixing with the mercury containing fuel. A wide variety of water soluble chlorine containing inorganic compounds is known. Non-limiting examples include sodium chloride, potassium chloride, sodium chlorate, and potassium chlorate.

The sorbent composition applied to remediate mercury and sulfur contains the individual components in amounts sufficient to effectively remove or reduce the amount of sulfur and mercury emitted from the combustion process. In a non-limiting exemplary embodiment, the sorbent composition comprises about 20 to about 30% weight Portland cement, about 2 to about 5% weight inorganic chlorine compound, about 20 to about 40% weight calcium oxide, about 20 to about 30% weight of the clay, and about 1 to about 9% weight of the alkali metal salt. The sorbent composition may further comprise at least one oxidizing salt as discussed above. Preferred oxidizing salts include calcium nitrate, calcium nitrite, and combinations thereof. As discussed above, a preferred embodiment includes applying a liquid sorbent containing at least one of the oxidizing salts onto the carbonaceous fuel. Before or after addition of the liquid sorbent, but preferably after, the powder sorbent composition described above may be mixed with the fuel.

In an alternative preferred embodiment, the liquid sorbent added to the carbonaceous fuel contains not the oxidizing salts or anions discussed above, but rather at least one alkali metal salt selected from the group consisting of potassium silicate, sodium silicate, potassium hydroxide, and sodium hydroxide. The liquid sorbent may be added to the carbonaceous fuel either before or after the powder composition is applied.

In some embodiments, only a liquid sorbent is applied onto the coal before combustion, without the necessity of adding an additional powder composition. In a preferred embodiment, the liquid is made up of water and dissolved solids. The dissolved solids are made of a calcium salt or salts selected from the group consisting of calcium nitrate, calcium nitrite, and combinations thereof, as well as other optional water soluble components. In preferred embodiments, up to 6% weight of the solids in the liquid sorbent is applied onto the coal. More than 6% weight may be applied, however, it is desired to keep the addition of solids to a minimum to avoid the need for expensive handling of ash after combustion. In another preferred embodiment, up to 3% weight of the solids in the liquid sorbent is applied onto the coal. In a preferred embodiment, the liquid sorbent comprises both calcium nitrate and calcium nitrite. The liquid sorbent containing the calcium nitrate and/or calcium nitrite generally contains from about 30% to about 79% weight water. The lower water level is determined by the solubility of the salts, while the upper lever of water is relatively arbitrary. However, the upper level of water in the sorbent composition is determined by the desire to efficiently add solids onto the carbonaceous fuel by spraying and other means. It has been found that other inorganic compounds can be added to the liquid sorbents that aid in wetting of the carbonaceous fuel. For example, calcium bromide may be added to the liquid sorbent to increase wetting.

In yet another alternative embodiment of methods of the invention, a liquid sorbent is applied onto the coal followed by application of a powder sorbent composition. The liquid sorbent may or may not contain calcium, but comprises water and a group of solids selected from the group consisting of soluble metal nitrates and soluble metal nitrites; calcium bromide may be added to the liquid sorbent to increase wetting.

In yet another alternative embodiment of methods of the invention, a liquid sorbent is applied onto the coal followed by application of a powder sorbent composition. The liquid sorbent may or may not contain calcium, but comprises water and a group of solids selected from the group consisting of soluble metal nitrates, soluble metal nitrites, and combinations thereof. As in other embodiments, preferred nitrates and nitrites include the calcium salts. In the present embodiment, the powder sorbent composition is one that contains at least calcium. In a preferred embodiment, the powder sorbent composition further comprises silicon, aluminum, iron, and magnesium. In an exemplary composition, the powder sorbent comprises Portland cement, calcium oxide, preferably an aluminosilicate clay, and a dolomitic material selected from the group consisting of dolomite and burnt dolomite. In an alternative embodiment, the powder sorbent composition comprises Portland cement, calcium oxide, at least one water soluble chlorine containing inorganic compound, preferably an aluminosilicate clay, and at least one alkaline metal salt selected from the group consisting of potassium silicate, sodium silicate, potassium hydroxide, sodium hydroxide, potassium oxide, and sodium oxide. When the powder sorbent composition comprises the chlorine containing inorganic compounds, the compositions are especially suitable for reducing mercury in the products of combustion of the fuel.

In addition to the methods of the invention, the invention also provides various combustible carbonaceous fuel compositions. The compositions contain up to 99% weight of particulate carbonaceous fuel, and up to 10% weight based on the weight of the total combustible carbonaceous fuel compositions of inorganic materials. In a first alternative embodiment, the inorganic materials include calcium oxide, at least one calcium compound selected from the group consisting of calcium nitrate, calcium nitrite, and combinations thereof; an inorganic source of silicon; an inorganic source of aluminum; an inorganic source of iron; and preferably an inorganic source of magnesium. The inorganic materials may further comprise calcium bromide. In an exemplary embodiment, the inorganic materials comprise calcium nitrate, calcium nitrite, Portland cement, calcium oxide, preferably an aluminosilicate clay, and a dolomitic material selected from the group consisting of dolomite and burnt dolomite.

In one aspect of the invention, the inorganic materials are the result of the depositing or application of the liquid and/or powder sorbents discussed above.

In an alternative embodiment, the inorganic materials include Portland cement, at least one water soluble chlorine containing inorganic compound, an aluminosilicate clay and an alkali metal clay selected from the group consisting of sodium silicate, potassium silicate, sodium hydroxide, potassium hydroxide, sodium oxide, and potassium oxide. In an exemplary embodiment, the inorganic materials comprise:
  from about 20% to about 40% weight Portland cement;
  from about 20% to about 40% weight calcium oxide;
  from about 2% to about 5% weight of at least one water soluble chlorine containing inorganic compound;
  from about 20% to about 30% weight of clay; and
  from about 1% to about 9% weight of alkali metal salts.

In various exemplary embodiments, the water soluble chlorine containing inorganic compound and the aluminosilicate clay are as described above. In this and other embodiments described above, the clay may be selected form a number of suitable inorganic materials. Non-limiting examples of suitable clay include calcium montmorillonite, sodium montmorillonite, hectorite, smectites, illites, kaolin, and metakaolin.

Carbonaceous fuel for use in the invention may be used as supplied or may be prepared for application of liquid and powder sorbent compositions of the invention. In a preferred embodiment, coal is ground to uniform size, for example −¼", prior to application of the sorbent composition. Liquid sorbents can be added directly to the pulverized or ground fuel. For liquid sorbents, the addition can be made with a spray bar system that can be directed to the fuel as it passes over a belt or other transport systems. Alternatively, the liquid sorbent can be added to the particulate fuel in a mixer. The powder sorbent compositions of the invention are generally applied to the particulate coal directly. In a preferred embodiment, the particulate coal and the solid sorbent compositions are blended with one another in mixers or similar devices. Alternatively or in addition, sorbent compositions are added into the pulverizers that pulverize the coal prior to injection.

Coal is a preferred carbonaceous fuel for use in the invention. Coal suitable for use in the invention includes bituminous coals, anthracite coals, and lignite coals. Other carbonaceous fuels include, without limitation, various types of fuel oils, coal oil mixtures, coal oil water mixtures, and coal water mixtures. When the carbonaceous fuel is other than a particulate coal or other fuel as described, the method of addition of the liquid and solid sorbents described above may be adapted for use with the liquid fuels according to principles known in the art.

Portland cement is an article of commerce, exemplified according to ASTM Standards as Type I, II, III, IV, or V. Portland cement consists principally of di- and tri-calcium silicates. In some embodiments, it is manufactured by firing limestone with sand in a kiln at high temperature. The resulting clinker is crushed and ground to form a cement product.

The composition of Portland cements is reported in terms of percent by weight by various metal oxides. Particularly a Portland cement contains greater than about 60% weight calcium oxide, around 20-30% weight silicon dioxide, and from about 2-6% weight aluminum tri-oxides, as well as generally lesser amounts of iron (III) oxide and magnesium oxide equivalents. In some embodiments, Portland cement Type III is preferred because it consistently has the highest content of calcium oxide. In various embodiments discussed in this specification, the Portland cement will thus be described as containing or comprising calcium oxide, silicon dioxide, aluminum dioxide, iron oxide, and magnesium oxide. It is to be understood that such a representation is a short hand way of describing the composition of Portland cement, which as discussed above is defined in the ASTM Standards. The Portland cement and other inorganic components of the various sorbent compositions of the invention will alternatively be described as containing a source of calcium, a source of silicon, a source of aluminum, a source of iron, and a source of magnesium.

Aluminosilicate clays are optional and preferred components in many of the powder sorbent compositions of the invention. When present, they may be selected from a wide variety of materials as discussed above. In various embodiments, preferred clays include calcium montmorillonite, sodium montmorillonite, kaolin, and metakaolin.

In various embodiments, the sorbent compositions contain water soluble chlorine containing inorganic materials. Non-limiting examples of soluble chlorine containing inorganic materials include the soluble chlorides, chlorites, chlorates, hypochlorites, and perchlorates. In a preferred embodiment, soluble chlorine containing inorganic materials are selected from the group consisting of alkaline earth salts containing the above anions and alkali metal salts containing the above anions. Particularly preferred are the sodium and potassium salts. In various embodiments, the chlorine containing inorganic material is selected from the group consisting of potassium chloride, sodium chloride, potassium chlorate, and sodium chlorate. Mixtures or combinations of chlorine-containing inorganic compounds may also be used.

In some embodiments, the liquid sorbents of the invention contain oxidizing salts, such as the nitrates and or nitrites of calcium or other alkaline earth metals or of alkali metals. In a preferred embodiment, the oxidizing salts comprise both the nitrate and the nitrite of an alkali metal or alkaline earth metal. When both nitrites and nitrates are present, their relative proportion can range from about 5:95 to 95:5. In a preferred embodiment, the proportion is about 1:1, or 50:50. When the oxidizing salts contain calcium nitrate or calcium nitrite, the liquid sorbent may further preferably contain an inorganic salt that improves the wetting ability of the calcium nitrate and the calcium nitrate in solution. A preferred wetting agent for this purpose is calcium bromide. A solution containing 10-30% weight calcium nitrate, 10-30% weight calcium nitrite, and 1-10% weight calcium bromide, the remainder being water, is sold commercially as a low temperature setting aid for concrete.

When a liquid sorbent and a powder sorbent are both to be added, the relative proportion of the powder sorbent and the liquid sorbent can range from about 5:95 to 95:5. In a preferred embodiment, the powder sorbent compositions and the liquid sorbent compositions of the invention are added to the carbonaceous fuel in a ratio of about 1:1. The ratio to be used depends on the relative concentration of components in the two sorbents, as well as the desired level of incorporation into the combustible fuel composition of the respective components of the two sorbents.

The powder composition and the liquid compositions are added to the fuel in an effective level, keeping in mind that it is desirable to minimize the addition of the sorbent compositions if possible to avoid the necessity to handle or dispose of large volumes of ash. Conveniently, it has been found that additions of up to about 6% weight of the solid materials (that is, no more than about 6% by weight) in the powder and/or liquid sorbent composition can lead to acceptable results. In preferred embodiments, up to 3% weight of the powder compositions and of up to 3% weight of the solids in the liquid sorbent compositions are added to the carbonaceous fuel. In some embodiments, 3% weight of a powder composition and 3% weight of a liquid composition are applied to the fuel before burning. If the liquid composition is made of 50% solids this corresponds to adding 1.5% weight of the solids of the liquid composition onto the carbonaceous fuel.

When both are added, the order of addition of liquid sorbent compositions and powder sorbent compositions may be varied to achieve the desired results. In many embodiments, it is preferred to add the liquid sorbent composition to the fuel before adding the powder sorbent composition. This has the tendency to improve adhesion of the powder components, which are applied onto a wetted fuel.

Dolomitic material as used in the invention is a calcium and magnesium carbonate material. It is commercially available as dolomite or, in an alternative embodiment, as so-called burnt dolomite. Burnt dolomite is the product of heating or calcining the dolomite material. Burnt dolomite is believed to be a combination of magnesium oxide and calcium oxide material. In various embodiments, the addition of dolomitic magnesium is believed to hold the cell structure of the silicate and aluminosilicate material open for improved sulfur absorption. In a preferred embodiment, dolomitic magnesium is provided in addition to the magnesium that is provided in the Portland cement.

Use of the methods and compositions of the invention results in burning of coal and of other carbonaceous fuels with reduced emission of volatile sulfur gases or harmful compounds into the atmosphere upon combustion. In addition to the deleterious health and environmental effect of emitted sulfur gases, another important concern to utilities and other coal consumers is the regulatory scheme around the emission of sulfur oxides. Specifically, current regulations in the United States require that if more than 1.2 pounds (about 550 g) of sulfur dioxide is released into the atmosphere for every million BTU of coal that is burned, the coal facility operator must purchase so-called pollution credits or mitigate the release of sulfur gases below that level. Depending on the amount of sulfur in the coal, such pollution credits can constitute a major expense of operation. Accordingly, it would be beneficial to reduce the emission of sulfur below that level. Coal that can be burned in power plants and other facilities with concomitant release of less than 1.2 lbs of sulfur dioxide per million BTUs is called in the United States as compliant coal. In various embodiments, the compositions and methods of the invention result in the production of compliant coal that can be burned to generate electricity and for other uses without harming the environment or incurring liability for regulatory pollution costs.

The invention has been described with respect to various preferred embodiments. Further non-limiting embodiments are given in the Examples that follow.

The description of the invention is merely exemplary in nature and, thus, variations that do not depart from the gist of the invention are intended to be within the scope of the invention. Such variations are not to be regarded as a departure from the spirit and scope of the invention.

EXAMPLES

Example 1

Powder Composition 1

A powder composition is mixed that contains 30% weight Portland cement, 40% weight calcium oxide, 20% weight dolomite, and 10% weight calcium montmorillonite.

Example 2

Minkota lignite coal having a raw sulfur content of approximately 2.0% weight, an ash content of approximately 16% weight, and a moisture content of approximately 30% is ground to −¼ inch and mixed with either no sorbent (Comparative Example 1), a sorbent consisting solely of Portland cement (Comparative Example 2) or a sorbent consisting of powder sorbent 1 of Example 1. Addition of sorbent material to the coal is 6% weight For the compositions containing the sorbents, the respective sorbent compositions and the coal are mixed in a Hobart Mixer with a vertical paddle at 60-90 RPM for two minutes. Then the coal samples are combusted. Total sulfur in the samples is determined according to ASTM D-4239, while the total sulfur sorbed in the ash is determined according to ASTM D-5016. According to data in the table, burning of the raw coal (Comparative Example 1) results in 61% of the sulfur being sorbed in the ash, while addition of Portland cement as a sorbent (Comparative Example 2) increases the percent sorbed to 71%. The coal sample (shown as Example 2) having the powder sorbent of Example 1 shows 79.9% of sulfur sorbed in the ash.

|  | % Sulfur in Sample | % Sulfur sorbed in ash |
| --- | --- | --- |
| Comparative Ex. 1 | 2.07 | 61.0 |
| Comparative Ex. 2 | 2.00 | 71.0 |
| Example 2 | 1.95 | 79.9 |

Example 3a

Powder Composition 2

A powder sorbent composition is mixed that contains 30% weight Portland cement, 3% weight sodium chloride, 33% weight calcium oxide, 25% weight metakaolin, 4.5% weight anhydrous potassium silicate, and 4.5% weight potassium hydroxide powder.

Example 3b

Liquid Sorbent Composition 1

Liquid sorbent composition 1, commercially available from Grace Chemical under the DCI tradename, contains 10-15% calcium nitrite, 10-25% calcium nitrate, 1-3% calcium bromide, the remainder being water.

Example 4

Illinois Crown III Bituminous Coal

The coal of Example 4 is Illinois Crown III bituminous coal containing approximately 4% weight sulfur, 10.6% weight ash, and 15.6% weight moisture. The coal is ground to minus one quarter inch and combined with various sorbents as provided in the table. The coal is prepared and the sorbents are applied as in Example 2. Percent sulfur in the sample is determined according to ASTM D-4239, while total sulfur reporting to ash is determined by ASTM D-5016. The percent total sulfur in the emissions is determined by the difference.

For this high sulfur coal, only 3.4% of the total sulfur reports to the ash upon combustion without any sorbent (Comparative Example 3). When Portland cement alone is used as the sorbent composition, only 13% of the total sulfur reports to ash (Comparative Example 4). When Composite Powder 2 is added at a 6% weight level, the percent total sulfur reporting to ash increases to 44.9% (Example 4a). When 3% weight of the Powder Composition 2 and 3% weight of the liquid sorbent 1 from Example 3a and 3b, respectively, are added as sorbent to the coal, the percent total sulfur reporting to ash increases to 50.5%.

|  | % Total Sulfur In Sample | % Sulfur in Emissions | % Total Sulfur Reporting to Ash |
| --- | --- | --- | --- |
| Comparative Ex. 3 | 4.17 | 96.51 | 3.4 |
| Comparative Ex. 4 | 4.06 | 87.0 | 13.0 |
| Example 4a | 3.84 | 55.15 | 44.9 |
| Example 4b | 3.84 | 49.5 | 50.5 |

Example 5

Freeman Crown III coal is used as in Example 4. Untreated coal is burned and the amount of chlorine released into the atmosphere determined to be 0.19% (Comparative Example 5). When coal treated with 3% weight powder composition 1 and 3% weight liquid composition 1 is burned (Example 5), the amount of chlorine released into the atmosphere is 0.13%.

Example 6

Freeman Crown III coal is again used. When untreated coal is burned, the ash remaining after combustion contains 0.001% weight mercury (comparative example 6). When coal is treated with 3% by weight each of powder composition 2 and liquid composition 1, and combusted, the ash remaining after combustion contains 0.004% mercury.

Although the invention has been described above with respect to various preferred embodiments, it is to be understood that the invention is not limited to the disclosed embodiments. Rather, variations and modifications that would occur to one of skill in the art upon reading the disclosure are also intended to be within the scope of the invention, which is limited and defined only by the appended claims.

What is claimed is:

1. A method for reducing the amount of sulfur gases released into the atmosphere upon combustion of a sulfur-containing coal in a furnace, the method comprising:
preparing a combustible fuel composition by applying a sorbent composition onto the sulfur-containing coal, wherein the combustible fuel composition consists of the sulfur-containing coal and the applied sorbent;
delivering the combustible fuel composition into the furnace; and
combusting the combustible fuel composition in the furnace to produce heat energy and ash,
wherein the sorbent composition comprises calcium nitrate, calcium nitrite, or both, wherein upon combustion of the coal to release its heat energy, the amount of sulfur in the ash is increased relative to the amount that would be produced by combustion of the coal without applying the sorbent composition.

2. A method according to claim 1, wherein the sorbent composition comprises calcium nitrite and calcium nitrate.

3. A method according to claim 1, wherein the sorbent composition further comprises calcium bromide.

4. A method according to claim 1, comprising applying an aqueous solution comprising calcium nitrate and calcium nitrite onto the fuel.

5. A method according to claim 1, comprising adding up to 6% dry weight of the sorbent composition onto the fuel.

6. A method for reducing the amount of sulfur gases released into the atmosphere upon combustion of a sulfur-containing coal in a furnace, the method comprising:

applying a powder sorbent composition onto the sulfur-containing coal;

delivering a combustible fuel composition comprising the applied powder sorbent composition and the sulfur-containing coal into the furnace; and combusting the sulfur-containing coal with the powder sorbent composition applied to produce heat energy and ash, wherein the powder sorbent composition comprises 20-50% by weight Portland cement 20-40% by weight calcium oxide 15-25% by weight of a dolomitic material selected from the group consisting of dolomite and burnt dolomite, and 5-15% by weight of an aluminosilicate clay, and wherein upon combustion of the coal to release its heat energy, the amount of sulfur in the ash is increased relative to the amount that would be produced by combustion of the coal without applying the powder sorbent composition.

7. A method according to claim 6, wherein the clay comprises calcium montmorillonite, kaolin, or a combination thereof.

8. A method according to claim 6, wherein the sorbent composition comprises about 30% by weight Portland cement, about 40% by weight calcium oxide, about 20% by weight dolomite, and about 10% by weight clay.

9. A method according to claim 6, wherein the sorbent composition further comprises at least one oxidizing salt selected from the group consisting of calcium nitrate and calcium nitrite.

10. A method according to claim 9, comprising applying the at least one oxidizing salt in an aqueous solution.

11. A method for reducing sulfur gases and/or mercury released into the atmosphere upon combustion of a coal containing sulfur and/or mercury comprising:

applying a powder sorbent composition onto the coal, delivering a combustible fuel composition consisting of the applied powder sorbent composition and the sulfur-containing coal into the furnace; and combusting the coal in the furnace with the powder sorbent composition applied to produce heat energy and ash, wherein the powder sorbent composition comprises Portland cement, at least one water soluble chlorine containing inorganic compound, calcium oxide, optionally an aluminosilicate clay, and an alkali metal salt selected from the group consisting of sodium silicate, potassium silicate, sodium hydroxide, potassium hydroxide, sodium oxide, and potassium oxide, wherein upon combustion of the coal to release its heat energy, the amount of sulfur in the ash is increased relative to the amount that would be produced by combustion of the coal without applying the powder sorbent composition.

12. A method according to claim 11, wherein the at least one chlorine containing inorganic compound comprises a soluble salt selected from the group consisting of sodium chloride, potassium chloride, sodium chlorate, and potassium chlorate.

13. A method according to claim 11, wherein the clay comprises metakaolin.

14. A method according to claim 11, wherein the powder composition comprises 20-30% by weight Portland cement, 2-5% by weight of the water soluble chlorine containing inorganic compound, 20-40% by weight calcium oxide 20-30% by weight clay, and 1-9% by weight of the alkali metal salt.

15. A method according to claim 11, wherein the sorbent composition further comprises at least one oxidizing salt selected from the group consisting of alkali metal nitrates, alkali metal nitrites, alkaline earth metal nitrates, and alkaline earth metal nitrites.

16. A method for reducing the sulfur gases released in the atmosphere upon combustion of sulfur-containing coal in a furnace, the method comprising applying a liquid sorbent and a powder sorbent onto the sulfur-containing coal, wherein the liquid sorbent comprises water and solids, the solids comprising at least one soluble salt selected from the group consisting of soluble metal nitrates and soluble metal nitrites and the powder sorbent comprises calcium to make a combustible fuel composition consisting of the sulfur-containing coal and the applied sorbents;

delivering the combustible fuel composition into the furnace; and combusting the combustible fuel composition in the furnace to produce heat energy and ash, wherein upon combustion of the coal to release its heat energy, the amount of sulfur in the ash is increased relative to the amount that would be produced by combustion of the coal without applying the liquid sorbent and powder sorbent.

17. A method according to claim 16, wherein the liquid sorbent comprises alkali metal nitrates, alkali metal nitrites, alkaline earth metal nitrates, alkaline earth metal nitrites, or combinations thereof.

18. A method according to claim 16, wherein the liquid sorbent comprises calcium nitrate and calcium nitrite.

19. A method according to claim 16, comprising applying up to 6% weight of the solids and up to 6% weight of the powder sorbent.

20. A method according to claim 16, comprising applying up to 3% weight of the solids and up to 3% weight of the powder sorbent.

21. A method according to claim 1, comprising applying up to 3% dry weight of the sorbent composition onto the fuel.

22. A method according to claim 1, comprising applying up to 1.5% dry weight of the sorbent composition onto the fuel.

23. A method according to claim 1, wherein the sorbent composition further comprises silicon dioxide, aluminum oxide, calcium oxide, and iron oxide.

24. A method according to claim 23, wherein the sorbent further comprises magnesium oxide.

25. A method according to claim 23, comprising adding a powder composition comprising silicon oxide, aluminum oxide, calcium oxide, and iron oxide onto the carbonaceous fuel.

26. A method according to claim 25, wherein the powder composition comprises Portland cement.

27. A method according to claim 25, wherein the powder composition comprises a dolomitic material selected from the group consisting of dolomite and burnt dolomite.

28. A method according to claim 23, comprising applying an aqueous solution comprising calcium nitrate and calcium nitrite onto particulate carbonaceous fuel, and adding the powder composition onto the wetted fuel.

29. A method according to claim 1, wherein the coal comprises lignite coal.

30. A method according to claim 1, wherein the coal comprises bituminous coal.

31. A method according to claim 1, wherein the coal comprises anthracite coal.

32. A method according to claim 6, wherein the coal comprises <4% by weight sulfur.

33. A method according to claim 6, wherein the coal comprises <3% by weight sulfur.

34. A method according to claim 6, wherein the coal comprises ≈2% by weight sulfur.

35. A method according to claim 6, wherein the coal comprises >4% by weight sulfur.

36. A method according to claim 6, comprising applying up to 6% weight of the sorbent composition onto the coal.

37. A method according to claim 36, further comprising applying a liquid sorbent comprising water and solids, the solids comprising at least one of calcium nitrate and calcium nitrite.

38. A method according to claim 37, comprising applying up to 3% weight of the powder composition and up to 1.5% weight of the solids in the liquid sorbent, based on the weight of the coal.

39. A method according to claim 15, wherein the oxidizing salt comprises calcium nitrate, calcium nitrite, or a combination thereof.

40. A method according to claim 11, further comprising applying a liquid sorbent onto the coal, the liquid sorbent comprising at least one oxidizing salt selected from the group consisting of alkali metal nitrates, alkali metal nitrites, and alkaline earth metal nitrates, and alkaline earth metal nitrites.

41. A method according to claim 40, wherein the oxidizing salt is selected from the group consisting of calcium nitrate, calcium nitrite, and combinations thereof.

42. A method according to claim 11, further comprising applying a liquid sorbent to the coal, the liquid sorbent comprising water and at least one alkali metal salt selected from the group consisting of potassium silicate, sodium silicate, potassium hydroxide, and sodium hydroxide.

43. A method according to claim 11, comprising applying up to 6% by weight of the powder composition based on the weight of the coal.

44. A method according to claim 11, wherein the coal comprises lignite coal.

45. A method according to claim 11, wherein the coal comprises bituminous coal.

46. A method according to claim 11, wherein the coal comprises anthracite coal.

47. A method according to claim 11, wherein the coal comprises greater than or equal to 2% by weight sulfur.

48. A method according to claim 11, wherein the coal comprises greater than or equal to 3% by weight sulfur.

49. A method according to claim 11, wherein the coal comprises greater than or equal to 4% by weight sulfur.

50. A method according to claim 16, wherein the powder sorbent composition comprises silicon, aluminum, calcium, iron, and magnesium.

51. A method according to claim 16, wherein the powder sorbent composition comprises:
Portland cement;
calcium oxide;
optionally an aluminosilicate clay; and
dolomitic material selected from the group consisting of dolomite and burnt dolomite.

52. A method according to claim 16, wherein the powder sorbent composition comprises
Portland cement;
calcium oxide;
at least one water soluble chlorine containing inorganic compound;
aluminosilicate clay; and
at least one alkali metal salt selected from the group consisting of potassium silicate, sodium silicate, potassium hydroxide, sodium hydroxide, potassium oxide, and sodium oxide.

53. A method that according to claim 1 wherein the coal being combusted has 2-4.5% by weight sulfur.

54. A method according to claim 1, wherein the coal combusted in the furnace is compliance coal.

55. A method according to claim 6, wherein the coal being combusted has 2-4.5% by weight sulfur.

56. A method according to claim 6, wherein the coal is selected from bituminous coal, anthracite coal, and lignite coal.

57. A method according to claim 11, wherein the coal being combusted has 2-4.5% by weight sulfur.

58. A method according to claim 11, wherein the coal is selected from bituminous coal, anthracite coal, and lignite coal.

59. A method according to claim 16, wherein the coal being combusted has 2-4.5% by weight sulfur.

60. A method according to claim 16, wherein the sulfur-containing coal is selected from bituminous coal, anthracite coal, and lignite coal.

* * * * *